April 27, 1954 — I. W. NORTH — 2,676,501
ADJUSTABLE ROTARY MACHINING TOOL
Filed Nov. 29, 1951
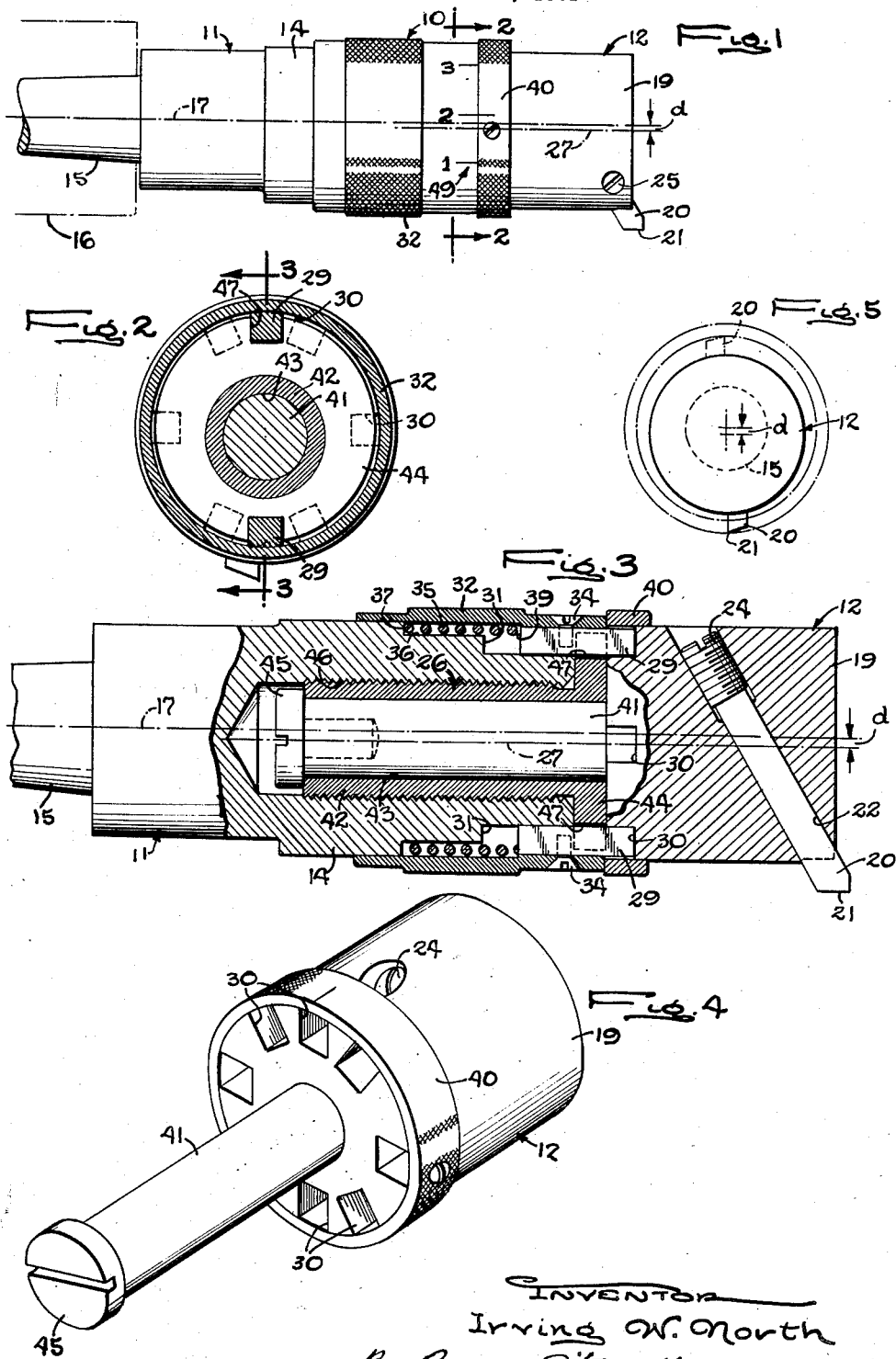
INVENTOR
Irving W. North
By Carlson, Pitzner, Hubbard & Wolfe
ATTORNEY Patented Apr. 27, 1954

2,676,501

UNITED STATES PATENT OFFICE 2,676,501

ADJUSTABLE ROTARY MACHINING TOOL

Irving W. North, Fond du Lac, Wis., assignor to Giddings & Lewis Machine Tool Company, Fond du Lac, Wis., a corporation of Wisconsin Application November 29, 1951, Serial No. 258,915

6 Claims. (Cl. 77—58)

The present invention relates to an adjustable tool adapted to be mounted on the rotary spindle of a machine tool or the like for machining a cylindrical surface on a workpiece.

One object of the invention is to provide a novel tool of the above type which is susceptible of quick manual adjustment without the use of hand tools to expeditiously condition the tool for taking cuts of different diameters whereby the tool is especially suited for successively taking roughing, intermediate, and finishing cuts on the same or succeeding workpieces.

Another object is to provide a tool of the foregoing character in which the adjustable tool parts are positively locked and accurately held in each adjusted position to form a rigid, compact unit.

Additional objects and advantages will be apprehended from the following description of the exemplary embodiment of the invention illustrated in the drawing, in which:

Fig. 1 is a longitudinal side view of a tool into which the invention is incorporated.

Fig. 2 is a transverse sectional view taken along line 2—2 of Fig. 1.

Fig. 3 is a longitudinal view partially in section taken generally along line 3—3 of Fig. 2.

Fig. 4 is a perspective view of the adjustable head assembly forming one component element of the tool.

Fig. 5 is a diagrammatic end view of the tool showing the radial position of the tool bit in its most extended condition of adjustment and illustrating in phantom the most retracted radial position of the tool bit.

Even though certain advantages reside in the specific correlation of parts forming the exemplary embodiment of the invention, it will be understood that the invention is not limited to the specific form shown but covers all equivalent embodiments of the invention falling within the spirit and scope of the claims.

Referring more particularly to the drawing, the tool 10 constituting the illustrated form of the invention, is designed for machining generally cylindrical internal surfaces on workpieces. Although tools incorporating concepts of the invention may be used for threading and other machining operations, the tool shown is adapted for use as a boring implement, a purpose for which the invention is most advantageous.

Fundamentally, the tool 10 comprises two basic parts or members, a driver 11, and a head 12, adjustably mounted on the driver. As shown, the driver is formed from an elongated cylindrical body 14 equipped at one end with supporting means, in this instance a projecting tapered arbor 15, fashioned for mounting the tool in a rotary machine tool spindle 16 or other comparable driving member. In addition to affording a support for the tool 10, the arbor 15, as used in conjunction with a machine tool driving member, moreover, defines a central axis 17 about which the tool is rotated in a machining operation. The head 12 comprises a second body 19 of generally cylindrical configuration disposed in tandem with the driver body 14 and adapted to support a cutting bit 20 with its point 21 radially disposed in a cutting position at one side of the head. For the purpose of illustration, the bit 20 constitutes an elongated bar of tool steel pointed at its outer end and inserted longitudinally into a long oblique socket 22 in the head body 19 and held in place by two screws 24, 25, Figs. 1 and 3.

In accordance with the present invention, the tool 10 is fitted with novel quick-change adjustment means especially designed for expeditious manual operation without the use of hand tools to adjust the tool for taking cuts of different diameters whereby the tool can be advantageously employed to take a succession of cuts (for example, roughing, intermediate, and finishing cuts) on the same or succeeding workpieces. In carrying out the invention the head 12 is mounted on the driver 11 by suitable journal means 26 for rotation about a second axis 27 which is generally parallel to the axis of rotation 17 of the tool but radially offset therefrom by a short distance "d" (see Figs. 1, 3, and 5) in a transverse plane disposed in axial alinement with the position in which the cutting point 21 of the bit 20 is carried by the head. As a matter of fact, this distance "d" is equal to one half the maximum range through which the tool will quickly adjust the radial position of the tool bit point 21 relative to the rotary axis 17 of the tool.

As indicated in Figs. 3 and 5, the bit point 21 is disposed at its maximum distance from the tool axis 17 for taking cuts of the largest diameter when the head 12 is positioned angularly relative to the driver 11 about the adjustment axis 27 to locate the bit point on the side of the adjustment axis directly opposite from the tool axis. By a similar token, the bit point 21 is disposed at its radially innermost position (as shown in phantom in Fig. 5) for taking cuts of the smallest diameter when the head 12 is rotated on the driver 11 to locate the bit point on the opposite side of the adjustment axis 27 in radial alinement with the tool axis 17. It follows that the tool point 21 is adjusted to intermediate radial positions relative to the tool when the head 12 is disposed at intermediate angular positions on the driver.

For the purpose of positively locking the tool head member 12 in various selected angular positions on the tool driver member 11 for the taking cuts of different diameter, one or more, preferably two, locking dogs 29 are slidably mounted on one of the two members 11, 12 for longitudinal movement into and out of interfitting engagement with selected ones of a plurality of circumferentially spaced dog receiving seats or sockets 30 on the other of said members. These sockets are selectively brought into circumferential alinement with the dogs 29 upon rotation of the two members 11, 12 relative to each other. Preferably, the two dogs 29 comprise two elongated keys (also designated by numerals 29) of rectilinear configuration slidably mounted in diametrically opposed slots 31 formed in the "head" end of the driver body 14. As shown, the slots 31 extend radially inward from the peripheral surface of the driver body 14 and are sufficiently long to permit the keys to be retracted longitudinally inward of the adjacent end of the driver body. Moreover, the slots 31 open axially through the "head" end of the driver to permit axial movement of the keys 29 into angularly spaced diametrical pairs of the key receiving sockets 30 formed in the immediately adjacent end of the head body 19. One pair of the sockets 30 is, of course, provided for each angular position of adjustment for the head 12.

A convenient manual actuator is provided for the keys 29 in the form of a hollow, elongated knurled sleeve 32 which surrounds the "head" end of the driver 11 in overlying relation to the keys. The sleeve 32 is suitably attached as by screws 34, to both keys 29 whereby longitudinal movement of the sleeve away from the driver 12 effectually removes the keys in unison from a mating pair of head sockets 30 to permit free rotation of the head to a new position of adjustment. When the head 12 has reached the new position, which brings another pair of the sockets 30 into alinement with the keys, the sleeve 32 is moved longitudinally in the opposite direction to insert the protruding ends of the keys 29 into these sockets. Preferably, the sleeve and key assembly is moved into and held in head locking position by a helical compression spring 35 disposed within an annular recess 36 in the outer surface of the driver body 14 under the sleeve and reacting at opposite ends on an annular shoulder 37 on the driver body and an abutment 39 on the movable assembly formed by the contiguous ends of the keys 29 and an annular shoulder on the sleeve alined therewith. To cover the sides of the head sockets 30, a narrow band 40 is affixed to the head to be conterminous with the sleeve 32 when the latter is in its normal position.

As to the details of the journal means 26 which rotatably interconnects the two tool members 11, 12 with each other, it will be perceived that the journal structure used is especially designed to afford sturdy support for the head 12 and at the same time permit easy assembly of the component journal parts with each other. One of the members 11, 12, preferably the head 12, is provided with a cylindrical stubshaft 41 extending from the inner end of the member along an axis coincident with the axis of adjustment 27 for the head. The stubshaft 41 is rotatably mounted on the driver 11 through the intermedium of a hollow bushing 42 defining cylindrical internal bearing surface 43 and having an annular flange 44 on one end thereof. As a step toward assembly of the tool, the bushing 42 is assembled on the stubshaft 41 with the bushing flange 44 abutting against the head and a capscrew 45 is screwed into the free end of the stubshaft to hold the bushing in place.

The bushing 42, which is externally threaded, is then screwed into a threaded axial bore 46 defined in the driver body 14 and opening inwardly from the "head" end of the driver. The bushing 42 and the threaded opening 46 in which the bushing is held are related to the driver body 14 whereby the axis of the cylindrical bearing surface 43 is coextensive with the adjustment axis 27 of the head 10. Preferably, the longitudinal axis of the bearing surface 43 and the driver body opening 46 are coaxial with each other and generally parallel to but radially offset from the rotary axis 17 of the tool.

After the bushing 42 has been screwed fully "home," bringing the bushing flange 44 firm against the contiguous end of the driver body 14, the bushing is prevented from loosening in its seat by the keys 29 which extend from the slots 31 through diametrically spaced notches 47 on the bushing flanges 44 in reaching toward the driver 12. The tool thus assembled is exceedingly compact and very sturdy.

Adverting briefly to the mode of operation of the tool 10, it will be apprehended that all that is necessary to adjust the radial position of the bit point 21 is that the operator grasp the knurled sleeve 32 in one hand and move this sleeve away from the tool head, thus releasing the head for rotation to a new position by the other hand of the operator. Then the operator merely releases his grip on the sleeve, and the sleeve and key assembly automatically returns to its initial position by the action of the spring 35 to lock the head in its new position. To aid in locating the head 12 in its various angular positions suitable indicia 49 are provided on the band 40 and sleeve 32.

I claim as my invention:

1. An adjustable boring tool adapted for quick adjustment without the use of hand tools for taking machine cuts of different diameters and comprising, in combination, a driver member, an elongated shank on one end of said driver member defining a rotary axis therefor and adapted to support said tool in a rotary element of a machine tool, a boring head member adapted to support a boring bit therein, a bearing on one of said members and a stubshaft on the other of said members and journaled in said bearing to connect said members for relative eccentric angular adjustment, said bearing and shaft having an axis which is offset from said rotary axis of said shank and positive locking means including at least one elongated locking key reciprocably mounted on said driver member, a plurality of angularly spaced key receiving sockets on said head member, and hand operable means interconnected with said key for engaging said key with selected ones of said sockets for locking said head member in selected angular positions relative to said driver member for adjusting the radial position of the cutting bit carried by said head member.

2. An adjustable rotary tool comprising, in combination, a driver member having means on one end thereof defining a rotary axis for said tool and adapted to support said tool in a rotary driving element of a machine tool for rotation about said axis, a tool head member adapted to support a bit therein, journal means interconnecting said head with said driver for angular adjustment relative thereto about a second axis radially offset from said tool rotary axis at a point axially alined with the position in which a bit is carried by said head, coacting locking means on said members manually operable without the use of hand tools for positively locking said head in various selected angular positions relative to said driver to adjust said tool for taking cuts of different diameters; said locking means including a longitudinal guide on the end of one of said members adjacent the other of said members, a plurality of angularly spaced dog receiving seats on the other of said members, a locking dog slidably mounted on said guide for longitudinal movement into and out of locking engagement with selected ones of said seats, resilient means interconnected between said one member and said dog for biasing the latter toward said seats, and an actuating member interconnected with said dog and adapted to be grasped in the hand of the operator for unseating said dog from locking engagement with the other of said members.

3. An adjustable boring tool adapted for quick adjustment without the use of hand tools for taking machine cuts of different diameters and comprising, in combination, a driver member, support means on one end of said driver member defining a rotary axis for said tool, a head member adapted to support a boring bit, eccentric journal means interconnecting said members and including an elongated stubshaft projecting from one end of one of said members, a bearing rotatably supporting said stubshaft and mounted on the other of said members, said journal means providing for angular adjustment of said head relative to said driver about a second axis generally parallel to but radially offset from said tool axis, a plurality of angularly spaced dog receiving seats on one of said members, at least one locking dog slidably mounted on the other of said members for longitudinal movement thereon, and an actuator on said dog adapted to be grasped in the hand of the operator for causing engagement of said dog with selected ones of said seats.

4. An adjustable boring tool comprising, in combination, a driver member having mounting means on one end thereof defining a rotary axis for said tool, a tool head member adapted to support a bit therein, journal means interconnecting said head with said driver for angular adjustment relative thereto about a second axis radially offset from said tool rotary axis at a point axially alined with the position in which a bit is carried by said head, coacting locking means on said members manually operable without the use of hand tools for positively locking said head in various selected angular positions relative to said driver to adjust said tool for taking cuts of different diameters; said locking means including two longitudinal slots defined on the end of one of said members adjacent the other of said members, a plurality of angularly spaced dog receiving seats on the other of said members, two elongated locking keys slidably mounted in said respective slots for longitudinal movement into and out of locking engagement with selected ones of said slots, an annular sleeve disposed in surrounding relation to said one member and interconnected with said keys, said sleeve being adapted to be grasped in the hand of an operator for longitudinal movement away from the other of said members to unseat said keys from coacting ones of said seats, and resilient means interconnected between said one member and said keys for biasing the latter toward seating relation with selected ones of said seats.

5. An adjustable rotary cutting tool comprising, in combination, a driver member having mounting means on one end thereof defining a rotary axis for said tool, a tool head member adapted to support a bit therein, journal means having an axis offset from said rotary axis and connecting said tool head member with said driver member for angular adjustment relative thereto, said members having respective contiguous generally cylindrical portions, one of said cylindrical portions having a first longitudinal peripheral slot therein, the other of said cylindrical portions having a plurality of angularly spaced second longitudinal peripheral slots therein, a manually movable sleeve slidably positioned around said one of said cylindrical portions in overlying relation to said first slot, and a key slidably positioned in said first slot and connected to the inside of said sleeve for movement thereby along said first slot into and out of a selected one of said second slots to lock said driver member and said head member together in selected relative angular positions and thereby adjust said tool for taking cuts of different diameters.

6. An adjustable rotary cutting tool comprising in combination, a driver member having mounting means on one end thereof defining a rotary axis for said tool, a tool head member adapted to support a bit therein, journal means having an axis offset from said rotary axis and connecting said tool head member with said driver member for angular adjustment relative thereto, said members having respective contiguous generally cylindrical portions, one of said cylindrical portions having a plurality of first longitudinal peripheral slots, the other of said cylindrical portions having a plurality of angularly spaced second longitudinal peripheral slots, a manually movable sleeve slidably positioned around said one of said cylindrical portions in overlying relation to said first slots, a plurality of keys slidably positioned in said first slots and rigidly connected to the inside of said sleeve for movement thereby along said first slots into and out of selected ones of said second slots to lock said head member and said driver member together in selected relative angular positions and thereby adjust said tool for taking cuts of different diameters, and spring means biasing said keys toward locking engagement with said second slots.

References Cited in the file of this patent

UNITED STATES PATENTS

| Number | Name | Date |
|---|---|---|
| 2,409,377 | Miller | Oct. 15, 1946 |
| 2,430,263 | West | Nov. 4, 1947 |
| 2,459,416 | Davis | Jan. 18, 1949 |